United States Patent
Holden et al.

(10) Patent No.: US 6,742,042 B1
(45) Date of Patent: May 25, 2004

(54) METHOD AND APPARATUS OF PRESENTING TICKER INFORMATION

(75) Inventors: Mark J. Holden, Allen, TX (US); Scott L. Orton, Allen, TX (US); Julie R. Simons, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 729 days.

(21) Appl. No.: 09/605,274

(22) Filed: Jun. 28, 2000

(51) Int. Cl.$^7$ ............................................. G06F 15/16
(52) U.S. Cl. ..................................... 709/230; 709/203
(58) Field of Search ............................... 709/203, 217, 709/230, 231; 379/1

(56) References Cited

U.S. PATENT DOCUMENTS

| | | | | |
|---|---|---|---|---|
| 5,045,848 A | * | 9/1991 | Fascenda | 340/825.26 |
| 6,516,349 B1 | * | 2/2003 | Lieberman | 709/225 |
| 6,529,516 B1 | * | 3/2003 | Parzych | 370/401 |

OTHER PUBLICATIONS

Steve Donovan, et al., *The SIP Info Method*, Internet Draft, pp. 1–7 (Jun. 1999).
Steve Donovan, *The SIP Info Method*, Internet Draft, pp. 1–10 (Feb. 2000).
LGI Systems Inc., *A Definition of Data Warehousing*, pp. 1–2, printed from web site http://www.dwinfocenter.org, dated at least as early as Feb. 12, 2000.
Jon Crowcroft, *Comments About H.323 and SIP*, pp. 1–6, printed from web site http://www.cs.columbia.edu (Jan. 22, 1998).
*Comparison of H.323 and SIP*, pp. 1–5, printed from web site http://www.cs.columbia.edu, dated at least as early as Feb. 3, 2000.
Information Sciences Institute, *Internet Protocol, Darpa Internet Program Protocol Specification*, RFC 791, pp. 1–48 (Sep. 1981).
J. Postel, *User Datagram Protocol*, RFC 768, pp. 1–3 (Aug. 1980).
M. Handley, et al., *SDP: Session Description Protocol*, RFC 2327, pp. 1–39 (Apr. 1998).
H. Schulzrinne, et al., *RTP: A Transport Protocol for Real–Time Applications*, RFC 1889, pp. 1–69 (Jan. 1996).
S. Deering, et al., *Internet Protocol, Version 6 (IPv6) Specification*, RFC 2460, pp. 1–36 (Dec. 1998).
M. Handley, et al., *SIP: Session Initiation Protocol*, RFC 2543, pp. 1–153 (Mar. 1999).
Adam Roach, *Event Notification in SIP*, Internet Draft, pp. 1–8 (Mar. 2000).
Scott Petrack, et al., *The Pint Service Protocol: Extensions to SIP and SDP for IP Access to Telephone Call Services*, Internet Draft, pp. 1–59 (Oct. 14, 1999).
Jiri Kuthan, *Sample Uses of SIP Info With Varying Reliability Needs*, Internet Draft, pp. 1–7 (Oct. 17, 1999).
Robert Sparks, et al., *SIP Telephony Service Examples With Call Flows*, Internet Draft, pp. 1–79 (Oct. 1999).

* cited by examiner

*Primary Examiner*—Mehmet B. Geckil
(74) *Attorney, Agent, or Firm*—Trop, Pruner & Hu, P.C.

(57) ABSTRACT

A communication system includes a packet-based data network that is coupled to various network elements. The network elements include user systems and a service provider system. Each of the user systems may send requests to the service provider system to receive selected categories of information. In response, the service provider system (or alternatively another information provider) transmits the requested information to each subscribing user system, which then presents the information as a ticker. Messaging used for communicating the ticker information may be based on the Session Initiation Protocol (SIP), including Subscribe and Notify messages or Info messages.

34 Claims, 7 Drawing Sheets

METHOD AND APPARATUS OF PRESENTING TICKER INFORMATION

FIELD OF THE INVENTION

The invention relates to presenting ticker information, and more particularly, to presenting information received over a packet-based network as a ticker.

BACKGROUND

With improvements in communications technology, a wide variety of mechanisms for providing information to users exist. Examples include electronic mail, viewing of web pages provided over the Internet, and broadcast of television programming. Scrolling tickers may be presented in television programming and web pages, most commonly for continuously updated information such as stock prices and sports scores. By providing continuous scrolling of information, the user may keep up to date with the latest changes in the presented information. Thus, while the user is performing some other task, he or she may occasionally peek at the scrolling ticker to track updated information that is of interest.

Typically, however, the information presented is controlled by the broadcaster or provider of the information. The information provider determines the timing and content of the ticker information. The user does not have the ability to control the information presented, except to turn on or off the ticker feature on the display (e.g., TV screen, web page, and so forth). For example, to view sports scores, a ticker would typically include the scores of all teams in a league (not just the teams of interest to the user). To view stock price updates, a ticker would include the prices of all stocks on one or more stock exchanges. The user is thus presented with a relatively larger volume of information, much of which may not be of interest.

As a result, to find out about a particular piece of information, a user may have to wait until the ticker scrolls to the item of interest, which may take a relatively long time period. For example, if a user is interested in the stock price of a given company or the sports score of a given team, he or she often must wait for updates of other stocks or sports scores to pass by.

A need thus exists for an improved method and apparatus of presenting information to a user.

SUMMARY

In general, according to one embodiment, a method of communicating information over a network includes requesting selected information to be received from an information provider system and receiving the selected information over the network. The selected information is then displayed as a ticker on a user device.

Some embodiments of the invention may include one or more of the following advantages. By presenting selected information as a ticker, the receiving user is presented with information updated on some predetermined basis (e.g., continuously, periodically, or at other selected intervals). Also, the ability to select information that is received as a ticker allows a user to filter out unwanted information. This reduces the amount of data presented so the user can focus on the selected information.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. Although reference is made to the Session Initiation Protocol or the H.323 Recommendation in the described embodiments, further embodiments may include other types of protocols or standards for establishing real-time interactive call sessions.

Figure 1:
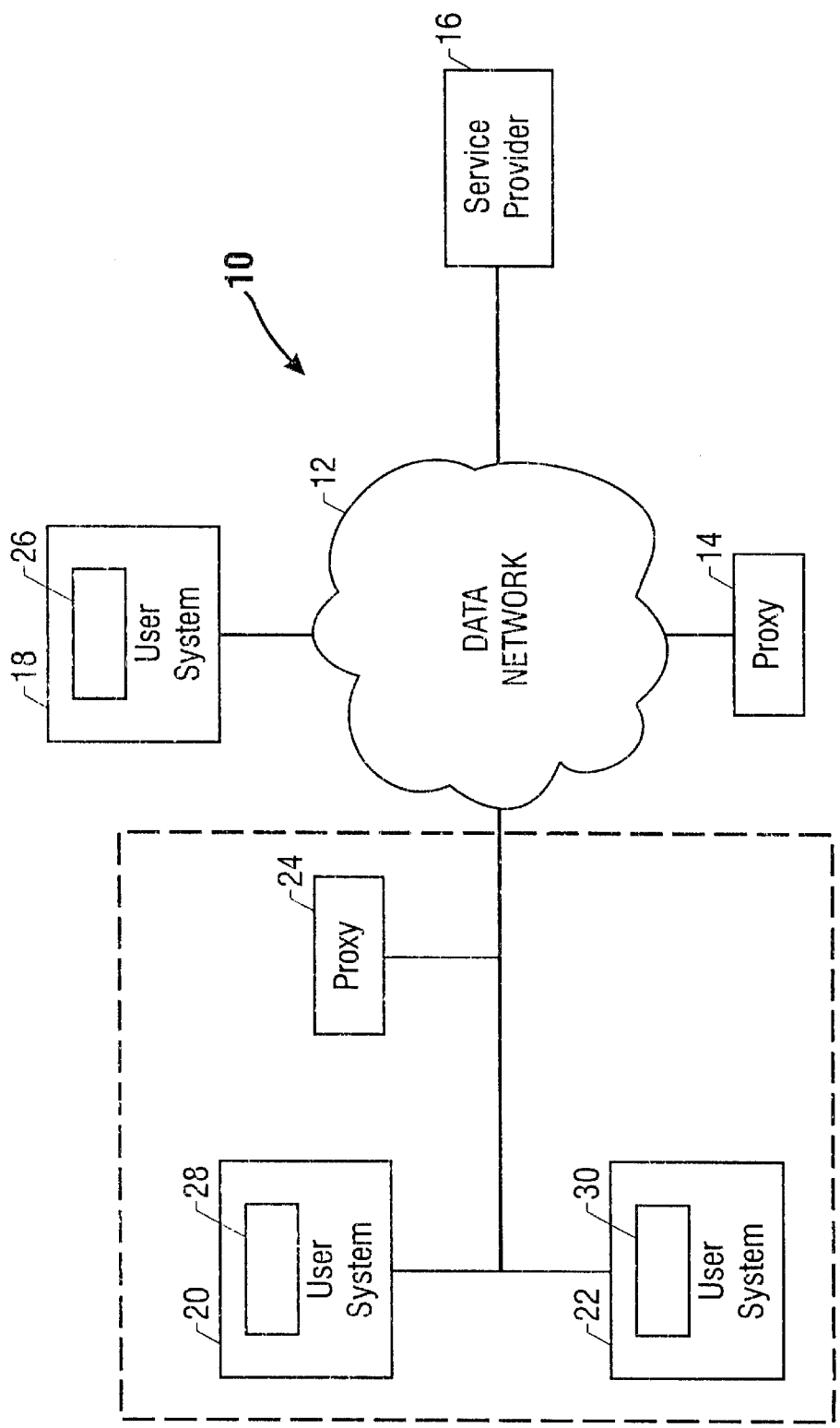
FIG. 1 is a block diagram of an embodiment of a communications system including a packet-based network.

Referring to FIG. 1, a communications system 10 includes a packet-based data network 12 that may be coupled to various network elements. The network elements include, as examples, various user systems (18, 20, 22 illustrated). The network elements may also include proxies 14 and 24, as well as a service provider system 16. The user systems 18, 20, and 22, the proxies 14 and 24, and the service provider system 16 are capable of participating in real-time interactive call sessions over the data network 12. A "user system" is any device or system (e.g., a telephone, computer, personal digital assistant) that can be used by a user to access or receive information over the data network 12. A "proxy" is a system that can process communications requests on behalf of other systems. For example, a proxy may be responsible for resolving addresses in communications requests. A "service provider system" is any system that provides any one or more of various services available over the data network 12. One such service is the communication of selected information indicated as being of interest to various users.

The service provider system 16 may be the repository of various types or categories of information that may be of interest to users having access to the data network 12. For example, the several categories of information may include stock prices, sports scores, weather conditions, traffic conditions, and so forth. The information may also include information of interest to a particular community or group (e.g., a neighborhood, a soccer team, a team or group in a business, and so forth).

A user at any one of the user systems 18, 20 and 22 may send an indication to the service provider system 16 (or to any other providers of information) that the user is interested in certain categories of information. Once the user system has subscribed or set up this interest, the service provider 16 may send the information that is of interest to the appropriate user system as a ticker.

As used here, "ticker" or "ticker information" refers to any presented information that is updated continuously, periodically, or at some other selected interval. The ticker information may be scrolled across a display, fixed at a position on the display, or move in a predetermined or random pattern over the display. If enabled, the ticker information, unlike pop-up windows or screens, remains on the display substantially on a continuous basis (if the ticker feature is enabled by a user). The ticker information may include text, graphics, or video data. Enabling of the ticker information may be selected by a file menu, an icon, placing a cursor over a predefined area of a screen, and so forth.

In the user system, a user interface may be provided to present the ticker information. In one embodiment, the user interface may be a display, such as displays 26, 28, and 30 in the respective user systems 18, 20, and 22. The user interface may also include an audio output for audio data as well as other types of presentation components.

In accordance with further embodiments of the invention, each of the user systems 18, 20, and 22 may also be configured to be the provider of information. Thus, a user system can request the receipt of predetermined information. In addition, the user system can also be the server of information to other user systems.

In addition to the ability to receive ticker information, the user systems 18, 20, and 22 may also be employed to participate in audio, multimedia, or other forms of call sessions in which streaming data is exchanged over the data network 12. For example, a user system may include a telephony device, such as a network telephone or a softphone (a computer fitted with audio processing capabilities). The connection between a user system and the data network 12 may be a wireless connection as well as a wired connection.

As used here, a "data network" or "network" may refer to one or more communications networks, channels, links, or paths and systems or devices (such as routers) used to route data over such networks, channels, links, or paths. A "call session" refers generally to audio (e.g., voice), video, or multimedia sessions established between two or more network elements coupled to the data network 12 (or any other packet-based data network). An "interactive" call session refers to a call session in which two or more parties are involved in an exchange of audio (e.g., voice) and/or video data between two or more network elements. A "real-time" interactive call session refers to an exchange of data, such as audio and/or video data, on a substantially real-time basis between two terminals. A session is substantially real-time if interaction is occurring between two end points or parties, with a communication from one end that may be followed relatively quickly by a response or another communications from the other end, typically within seconds, for example.

Interactive call sessions are contrasted with electronic mail messaging, for example, in which a first participant sends a message over a data network to a second participant. An interactive call session involves a request followed by some acknowledgment that a called party has accepted the call session. This enables establishment of an interactive call session in which participants exchange data.

In one embodiment, the packet-based data network 12 may include a packet-switched network such as an Internet Protocol (IP) network. One version of IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. Packet-switched data networks such as IP networks communicate with packets, datagrams or other units of data over the data networks. Unlike circuit-switched networks, which provide a dedicated end-to-end connection or physical path for the duration of a call session, a packet-switched network is one in which the same path may be shared by several network elements. Packet-switched networks are based on a connectionless internetwork layer. Packets or other units of data injected into a packet-switched data network may travel independently over any path (and possibly over different paths) to a destination point. The packets may even arrive out of order. Routing of the packets is based on one or more addresses carried in each packet.

The packet-based data network 12 may also be a connection-oriented network, such as an Asynchronous Transfer Mode (ATM) or a Frame Relay network. In a connection-oriented packet-based network, a virtual circuit or connection is established between two end points. In such connection-oriented networks, packets are received in the same order in which they were transmitted.

The arrangement illustrated in the FIG. 1 embodiment is as an example only. In other embodiments, other arrangements of elements in the communications system 10 may be possible.

The network elements, such as user systems 18, 20, and 22, may be capable of participating in Session Initiation Protocol (SIP) call sessions over the data network 12, which may include audio (e.g., voice), multimedia (e.g., audio and video) communications, or communications of other forms of data. SIP is part of the multimedia data and control architecture from the Internet Engineering Task Force (IETF). A version of SIP is described in RFC 2543, entitled "SIP: Session Initiation Protocol," dated 1999. SIP may be used to initiate call sessions as well as to invite members to a session that may have been advertised by some other mechanism, such as electronic mail, news groups, web pages, and other mechanisms. The other protocols in the IETF multimedia and control architecture include the Resource Reservation Protocol (RSVP), as described in RFC 2205, for reserving network resources; the Real-Time Transport Protocol (RTP), as described in RFC 1889, for transporting real-time data and providing quality of service (QoS) feedback; the Real-Time Streaming Protocol (RTSP), as described in RFC 2326, for controlling delivery of streaming media; the Session Description Protocol (SDP), as described in RFC 2327, for describing multimedia sessions; and the Session Announcement Protocol (SAP) for advertising multimedia sessions by multicast.

In further embodiments, other standards for establishing real-time interactive call sessions may also be used. Another standard is the H.323 Recommendation from the International Telecommunication Union (ITU), which describes terminals, equipment, and services for multimedia communications over data networks.

The user systems 18, 20, and 22 in FIG. 1 may be SIP client systems or SIP server systems. A SIP client system may include a client application program that is capable of sending SIP requests to perform call requests. A SIP server system may include a server application program that accepts SIP requests to service calls and to send back responses to SIP requests. Thus, each of the user systems 18, 20, and 22 may be a SIP client when initiating a SIP call session and a SIP server when responding to a SIP call request.

Each of the SIP proxy systems 14 and 24 may include an intermediary program that acts as both a server and a client for making requests on behalf of other clients. In one embodiment, the service provider system 16 may also be a SIP proxy system.

Figure 2:
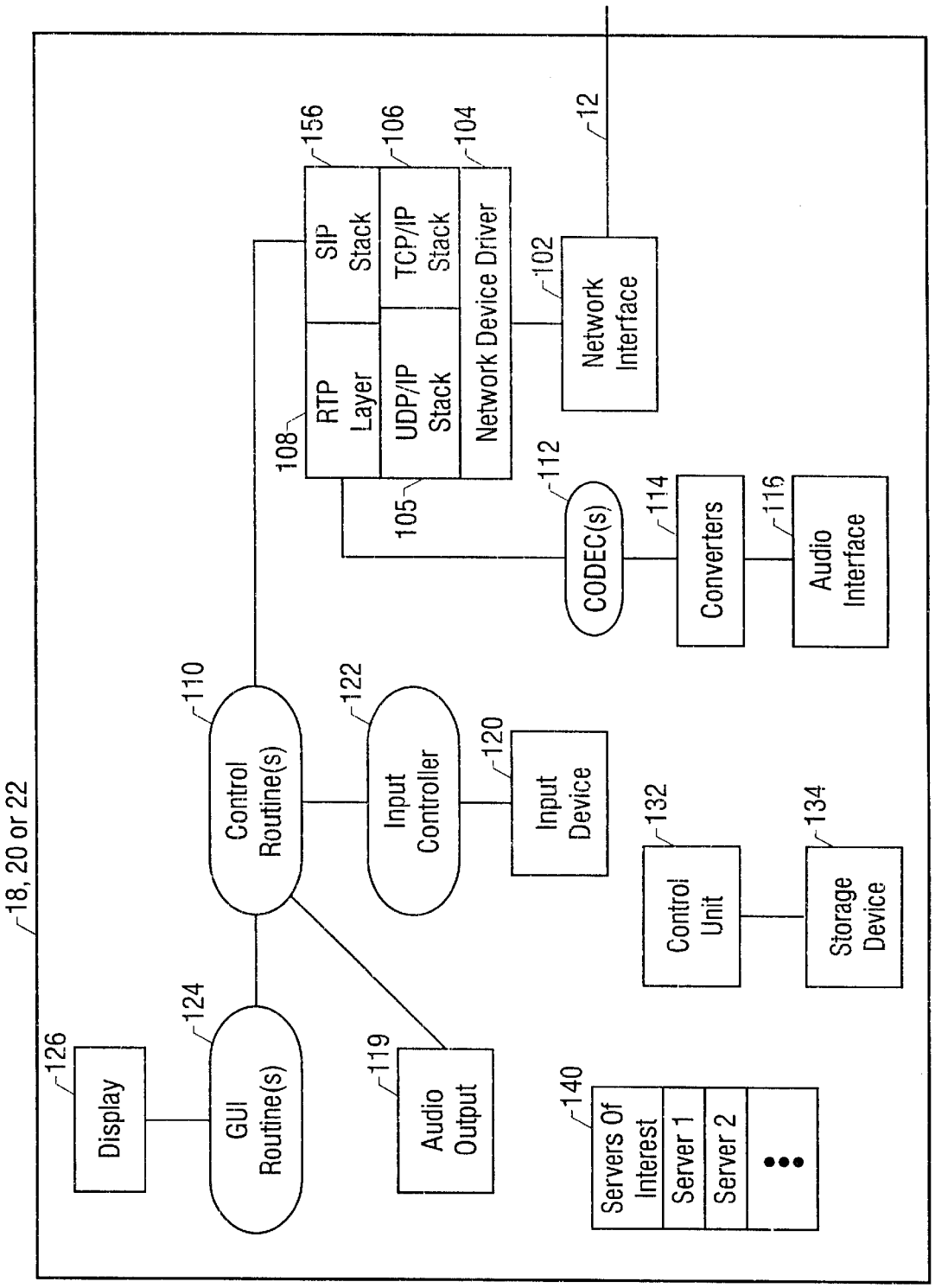
FIG. 2 is a block diagram of components in a user system according to one embodiment in the communications system of FIG. 1.

Referring to FIG. 2, the components of a user system (e.g., 18, 20, and 22) are illustrated in greater detail. The user system includes a network interface 102 that is coupled to the data network 12. Above the network interface 102 are several software layers, including a device driver layer 104, one or more transport and network stacks 105 and 106 (e.g., TCP/IP and UDP/IP stacks), an RTP layer 108, and a SIP stack 156. TCP is described in RFC 793, entitled "Transmission Control Protocol," dated September 1981; and UDP is described in RFC 768, entitled "User Datagram Protocol," dated August 1980. TCP and UDP are transport layers for managing connections between network elements on an IP network. In further embodiments, other types of transport and network stacks may be used.

Packets received by the network interface 102 are passed up through the several layers 104, 105 and/or 106, and 108 and/or 156. Control packets are transmitted by the transport and network stack (TCP/IP or UDP/IP) through the SIP stack 156 to one or more software control routines 110 in the user system. The SIP stack 156 is responsible for processing SIP message communications over the data network 12. The SIP stack 156 is generally a state machine that provides parsing, processing, and generation of SIP requests and responses. Instructions and data associated with the control routines 110 may be stored in a storage device 134, with the instructions executable on a control unit 132. The control routines 110 are responsible for generation of control signaling for participating in communications over the data network 12.

In addition, the control routines 110 may include application programs that may be launched to present ticker information received from a remote system. For example, an audio player application (for audio data), a video player application (for video data), a browser (for markup language files including text data), and other applications may be launched to present the ticker information on a display screen 126 (e.g., display 26, 28, or 30 in FIG. 1) or an audio output 119 (e.g., speakers). The ticker information may thus be presented on one of, or some combination of, the presentation devices listed above or other presentation devices.

The control routines 110 are also capable of sending requests to one or more information providers to receive selected information for presentation as a ticker. A list 140 of information providers is kept in the user system. Each information provider may be identified with predetermined categories of information. Thus, for example, a first information provider may provide weather information, and the user system may request receipt of updated weather information in Dallas, Tex. A second provider may be a system belonging to a little league soccer coach, who may provide updated information on practice times, game times, and so forth. Criteria information is also provided to identify the subset of information in each category that is of interest to the user. The criteria may thus be, as examples, specific sports teams, specific stocks, weather conditions in specific cities, traffic conditions on specific roads or highways, and desired neighborhood or other community information. The list of information providers may also be considered to be criteria that may be set by a user, since different information providers may provide different types or categories of information.

The user interface (presented on the display 126, for example) may include various sources. The user interface may be a web page containing an applet that can be launched in response to user input. The user interface may also be presented by another application. The user interface may also be at a location remote from the user system, such as in a wireless device (e.g., a mobile telephone or personal digital assistant). Other types of user interfaces may be available in other embodiments.

Audio data (e.g., voice data) may be passed through the UDP/IP stack 105 and the RTP layer 108 to a speech processing application (which is one of the control routines 110), which may also be executable on the control unit 132. The audio stream may be passed through a coder/decoder (CODEC) 112 for encoding and decoding of audio data. The audio stream is also passed through analog-to-digital and digital-to-analog converters 114 and an audio interface 116.

The display screen 126 in the user system may also be used to display information associated with a call session as well as provide call control selectors to enable a user to perform call control, under the control of one or more graphical user interface (GUI) routines 124. If the user system is a telephone, telephony buttons may also be included, such as numeric buttons, speed dial buttons, a transfer button, a hold button, a redial button and other buttons.

Figure 3:
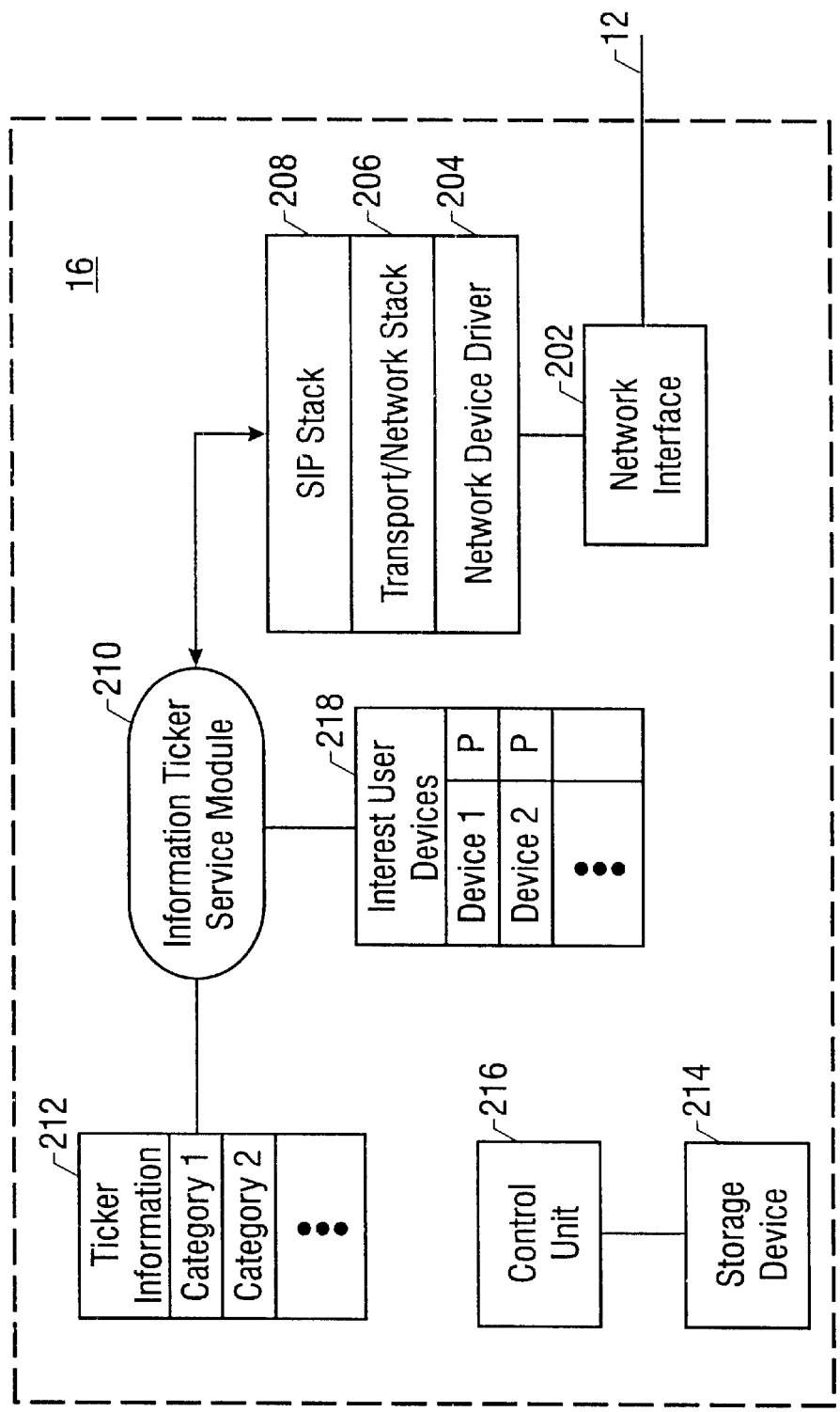
FIG. 3 is a block diagram of components in an information provider system according to an embodiment in the communications system of FIG. 1.

Referring to FIG. 3, components of the service provider system 16 are illustrated. To communicate over the data network 12, the service provider system 16 includes a network interface 202. Above the network interface 202 are a network device driver 204, a transport and network stack 206, and a SIP stack 208. The service provider system 16 includes an information ticker service module 210 that controls the presentation of selected information to the user systems 18, 20, and 22. The information ticker service module 210 is capable of receiving requests from each of the user systems for selected ticker information. The information ticker service module 210 has access to ticker information 212, which may be stored in one or more storage devices 214 in the service provider system 16. The ticker information 212 may be divided into several categories, with categories 1 and 2 illustrated in FIG. 3. As examples, the categories may include information relating to goods and services, sports scores, stock prices, weather conditions, traffic conditions, and so forth.

When the information ticker service module 210 receives a request for ticker information, it adds the requesting device to a list 218, which may also be stored in the one or more storage devices 214. The list 218 also stores the selected types of information (represented as "P") that is of interest to the requesting device in the list 218.

In an alternative arrangement, a request from a user system may not be necessary. The information ticker module 210 may be configured to automatically create a list of user systems based on some pre-stored information.

The information ticker service module 210 may also be present in any one of the user systems that is configurable to be an information provider. Thus, for example, in an enterprise, a group of users working on a project may each desire to distribute certain types of information to other users as ticker information, such as meeting notices, reminders that a conference room or lab will be used during certain time periods, and so forth. As another example, a little league soccer coach may post various notices regarding the team. Such information may be distributed to users who are interested in the information.

Figure 4:
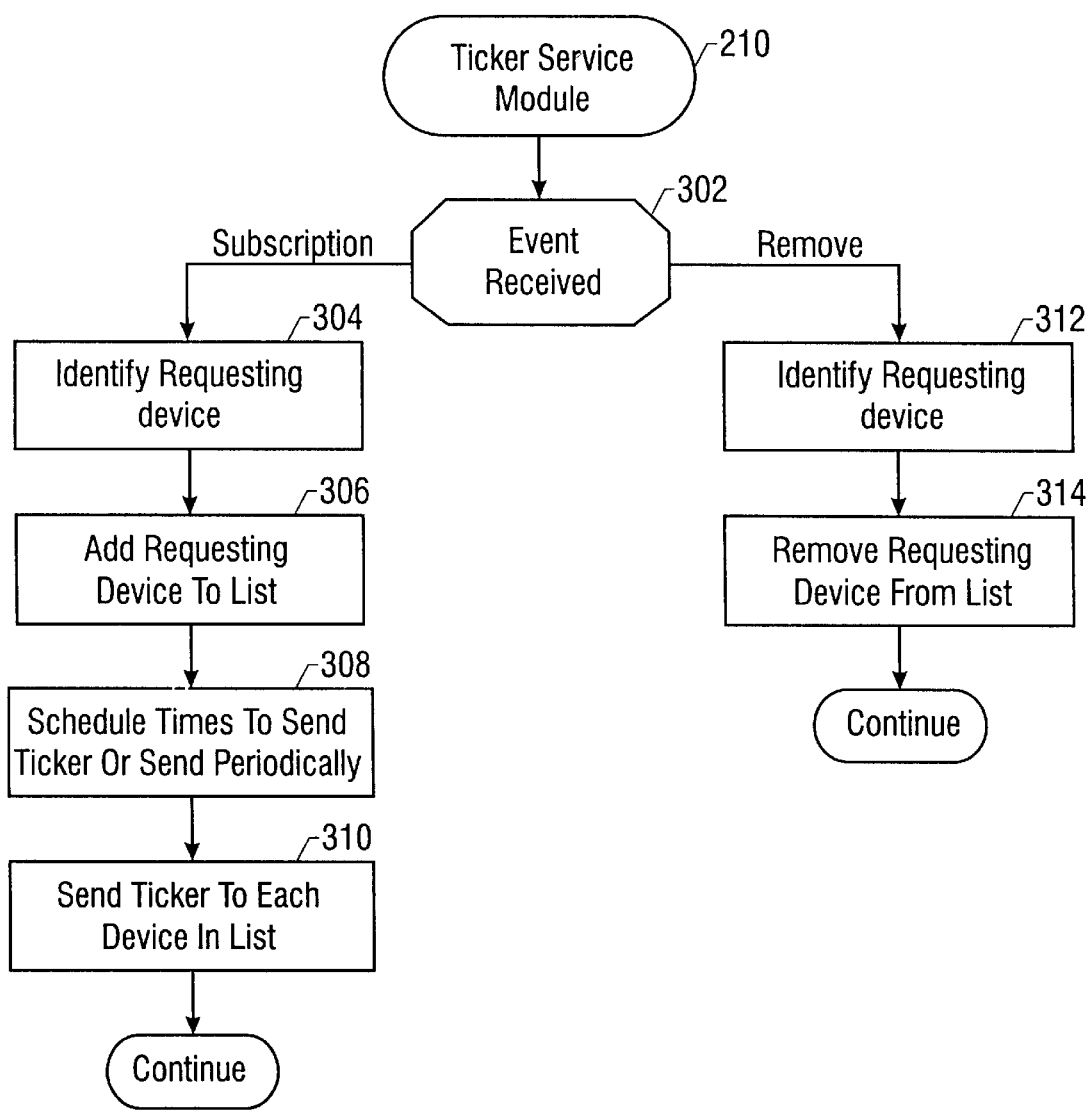
FIG. 4 is a flow diagram of a process performed by a ticker service module in accordance with an embodiment in the information provider system of FIG. 3.

Referring to FIG. 4, acts performed by the ticker service module 210 in accordance with an embodiment are illustrated. The ticker service module 210 waits for receipt of an event (at 302). The event may be a subscription event, in which a user system may be requesting subscription to receiving ticker information. In response, the ticker service module 210 identifies (at 304) the requesting system based on the received request. Next, the requesting system is added to the list 218 (306). Alternatively, the event received may be an internally generated event to update the list 218 without an explicit request received from a user system.

Next, the ticker service module 210 schedules (at 308) times to send the selected information. Alternatively, the selected information may be sent periodically, with the frequency specified, or at other predefined intervals. In one embodiment, a new transmission of ticker information to a given user system may not be performed unless there has been an update to the selected information. In an alternative embodiment, the ticker information may be sent periodically or at other selected intervals regardless of whether there has been an update or not. At the scheduled times, the ticker service module 210 then sends the selected information to each system in the list 218.

Another event that may be received by the ticker service module 210 is a remove or unsubscribe event, in which a user system no longer wishes to receive ticker information. Upon receipt of the request, the ticker service module 210 identifies (at 312) the requesting system. Next, the identified system is removed (at 314) from the list 218.

Figure 5:
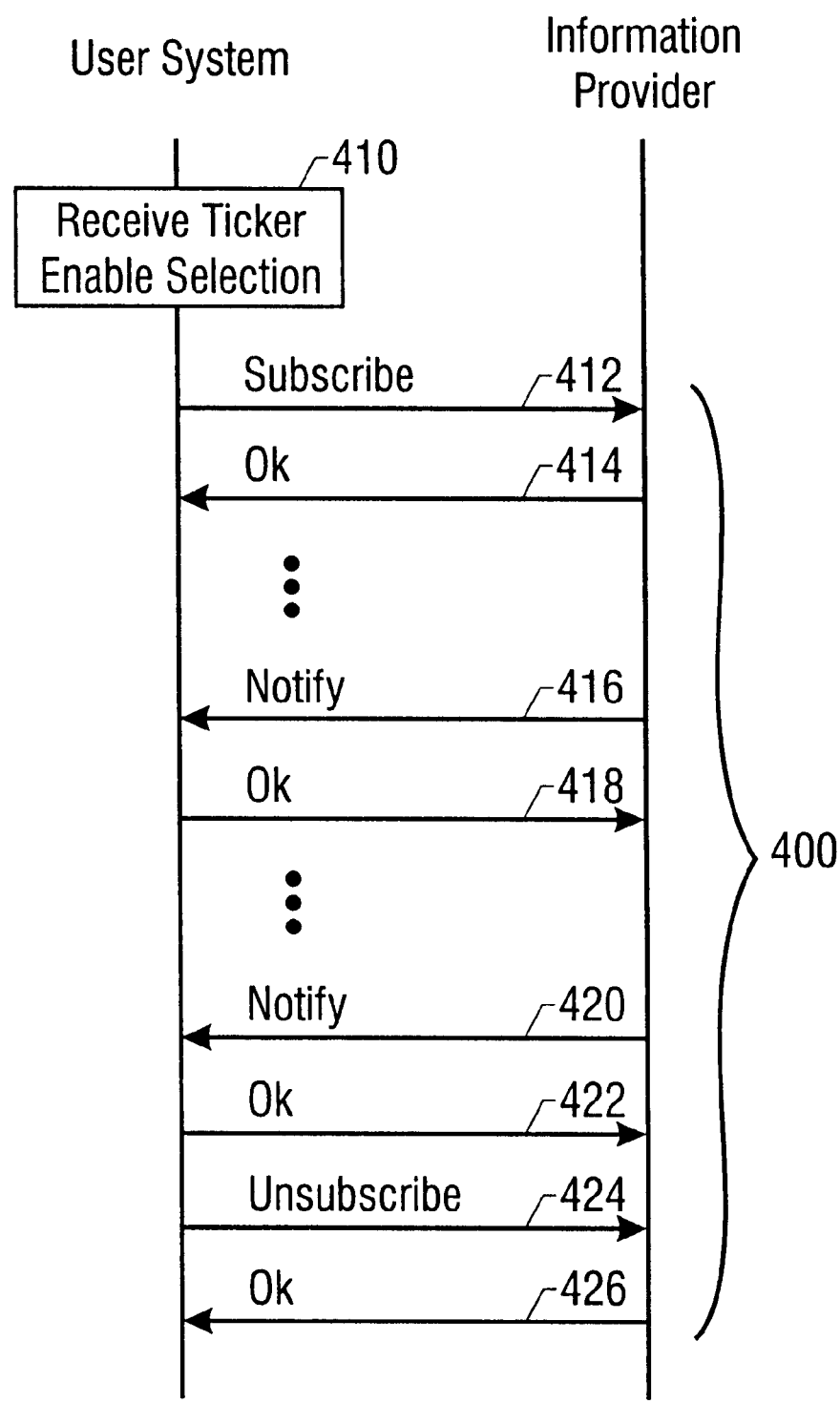
FIGS. 5 and 6 are message flow diagrams of processes of requesting and receiving selected information for presentation as a ticker in accordance with several embodiments.
Figure 6:
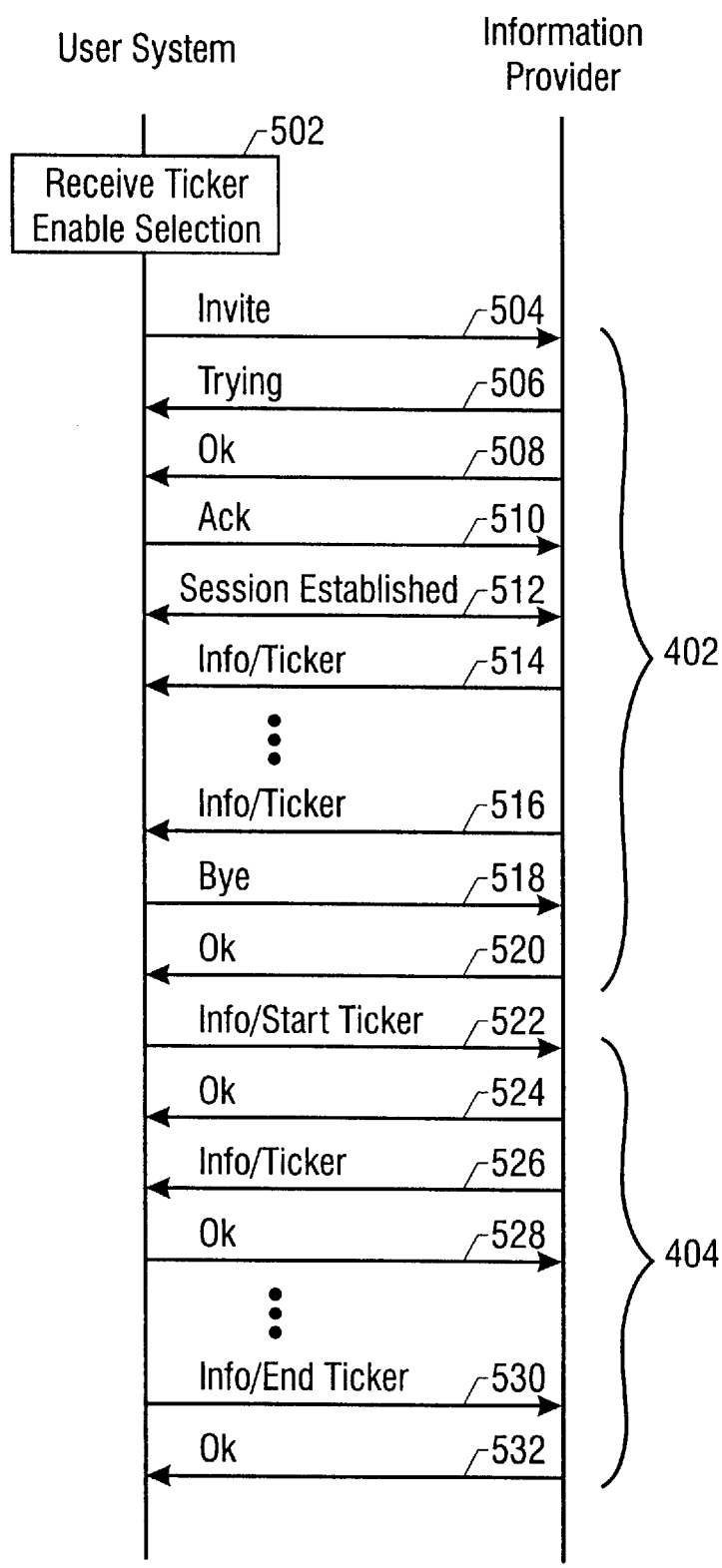
Figure 7:
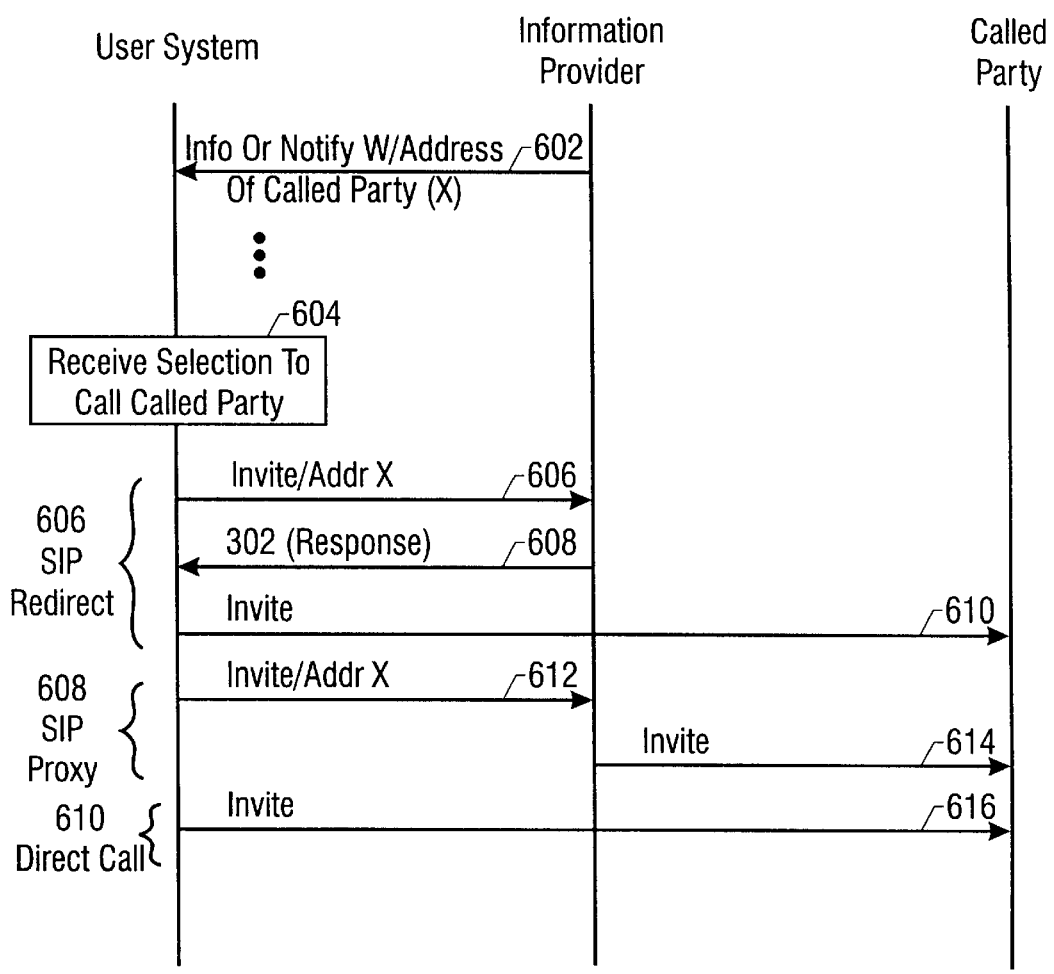
FIG. 7 is a message flow diagram of a process of establishing a communications session between a user system and a called party based on presented ticker information in accordance with an embodiment.

Referring to FIGS. 5 and 6, several techniques for communication of ticker information are illustrated. FIG. 5 illustrates a call flow 400 in which the Subscribe and Notify methods are used. FIG. 6 illustrates a call flow 402 in which a SIP call session is established and the Info message (referred to as an "in-band" Info message) is communicated in the established communications session. The call flow 404 illustrates use of "out-of-band" Info messages (those communicated outside an established communications session) to communicate ticker information.

Thus, the ticker information may be sent by an information provider in messaging that is consistent with a protocol providing for real-time interactive communications sessions (e.g., SIP or H.323). As used here, messaging is "consistent" with a protocol if the messaging is defined by the protocol, the messaging is an extension of the protocol, or the messaging is otherwise capable of being used in cooperation with other messaging defined by the protocol.

As shown in FIG. 5, the user system receives (at 410) an indication from the user, such as through a graphical user interface, a desire to receive a selected category of ticker information. The user system then sends a Subscribe message (at 412) to an information provider, which may be service provider system 16 or any one of the user systems 18, 20 and 22. (FIG. 1). The information provider then returns a 200 OK response (at 414) back to the user system. Some time later, when the information provider is ready, it sends a Notify message (at 416) to the user system. The Notify message includes the ticker information, or alternatively, the location of the ticker information that the user system may retrieve by some other mechanisms. Such other mechanisms may include use of a File Transfer Protocol (FTP), which is described in RFC 959, entitled "File Transfer Protocol (FTP)," dated October 1985; a Hypertext Transfer Protocol (HTTP), as described in RFC 2068, entitled "Hypertext Transfer Protocol—HTTP/1.1," dated January 1997; or other protocols for transferring data over the data network 12.

The Subscribe and Notify requests have been proposed as an extension to SIP to provide a framework by which SIP nodes can request notification from remote nodes concerning various events. As an example, a subscribe and notify technique is described in an Internet Draft entitled "Event Notification in SIP," dated March 2000. The Subscribe request may be used to request notification of an event or set of events at a later time. The Notify request may be used to notify a SIP node that an event which has been requested by an earlier Subscribe request has occurred. In addition, an Unsubscribe request may be used to indicate that the node which previously sent a Subscribe request no longer wishes to be notified of the event or set of events.

As long as a user system remains subscribed to receive requested ticker information, the information provider may continue to send Notify messages (at 420) to the user system. Receipt of each notify request is acknowledged by a 200 OK response (at 422). If the user system no longer wishes to receive the ticker information, it may send an Unsubscribe message (at 424) to the information provider. The information provider then removes the user system from its list and returns an OK response (at 426).

Referring to FIG. 6, alternative techniques of communicating ticker information are illustrated. The user system first receives (at 502) an indication to receive ticker information. In response, the user system sends a SIP Invite request (at 504) to the information provider. The Invite request is defined by SIP and indicates that the receiving node is being invited to participate in a communications session. The information provider next returns a Trying response (at 506) to indicate that the called user agent has located a possible location where the target has registered recently and is trying to alert the target. The information provider then returns an OK response (at 508) to indicate that the Invite request has succeeded. The user system then sends a SIP Ack request (at 510) to the information provider, at which point a communications session is established (at 512).

In the call flow 402, Info messages may be used to carry ticker information in the signaling path defined in the established communication session 512. A SIP Info message may be employed to carry application-level information. The application-level information may include commands, status information, as well as user-defined information such as ticker information. The Info message communicated in a signaling path of an established communication session is referred to as an "in-band" Info message.

As shown in FIG. 6, plural Info messages may be communicated (at 514 and 516) from the information provider to the user system. Although not shown, each Info message is acknowledged with an OK response.

Communication of the Info messages may continue for as long as the user system desires to receive the ticker information. When the user system no longer wishes to receive the ticker information, it sends a SIP Bye request (at 518) to the information provider. This effectively may be construed as a request to terminate subscription of the ticker information. The information provider then returns an OK response (at 520) back to the user system.

In an alternative embodiment, out-of-band Info messages may be used to subscribe to ticker information as well as to communicate ticker information. As shown in the call flow 404, a first Info message may be sent (at 522) from the user system to the information provider, with the Info message carrying an indication to start the communication of predetermined types of ticker information. The information provider returns an OK response (at 524) to acknowledge receipt of the first Info message. Thereafter, the information provider can start sending Info messages (at 526) to the user system containing the ticker information. Each receipt of an Info message is acknowledged by an OK response (at 528). To unsubscribe, the user system may send another Info message (at 530) to the information provider, with the Info message containing an indication to end the ticker service. The information provider acknowledges with an OK response (at 532).

In accordance with some embodiments, the ticker information may embed an address that may be used by the user system to contact another party (referred to here as a "called party"). The user system may receive an Info or Notify message (at 602) that contains the address of the called party (X). At some point during presentation of the ticker at the user system, the user may make a selection to call the called party. When the call request is received (at 604), the user system may initiate a request to contact the called party. Several methods may be used, as illustrated by 606 (a SIP redirect technique), 608 (a SIP proxy technique), or 610 (a direct call technique).

In the SIP redirect technique 606, an Invite request sent (at 606) containing the address X is received by the information provider, which sends back a 302 response (at 608) to direct the user system to call another address. This is referred to as redirecting the call. In response, the user system sends another Invite request (at 610) to the called party.

In the SIP proxy technique 608, the Invite request sent by the user system (at 612) and containing the address X is received by the information provider, which forwards the Invite request to the called party. Finally, in the direct call technique 610, the user system can directly call the called party with an Invite request sent (at 616).

Some embodiments may add other features. For example, information sent by each information provider may be associated with an expiration date or time. When the date or time expires, a posted item may be automatically deleted at the user system. Another feature may be some visual selector to enable a user to mark a given piece or category of ticker information as "ignore" so that the given piece of category of ticker information is removed from the display. An information provider may also be configured to determine whether any given user system can request or poll for selected information. Thus, a user without the proper privileges or permissions may be denied. Priority levels may be assigned to the ticker information so that a user may be notified of high priority items.

Employing some embodiments of the invention, a flexible information ticker service may be provided by any one of various information providers. The ticker service includes the presentation of a continuous scroll or feed of information at a user system. The information ticker information may be tailored to an individual's preferences so as to filter out information not of interest and to allow a user to focus on items of interest. An individual may be the receiver of ticker information at some times as well as the source at other times, giving each person the ability to communicate information to a group having a common interest.

Various examples of uses of some embodiments are provided below. In an enterprise, a group of users working on a project or team may communicate ticker information to each other, such as notices of meetings, use of conference or labs and so forth. Although notice of a meeting or use of a lab or conference room may be sent through e-mail, a continuous scrolling of a notice keeps the notice at the forefront of the receiving person's mind. As another example, a soccer coach for a little league team may set himself or herself up as an information supplier for notices relating to the soccer time. Parents of the players may then include the server address of the coach in their polling list to receive the notices. Various other examples may also be provided.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of communicating information over a packet-based network, comprising:

requesting selected information to be received from an information provider system;

receiving the selected information over the packet-based network using messaging according to a protocol providing for real-time interactive communications sessions; and displaying the selected information as a ticker on a user device.

2. The method of claim 1, further comprising providing one or more selection criteria to identify the selected information.

3. The method of claim 2, wherein providing the one or more selection criteria includes include identifying plural information provider systems from which information is to be received.

4. The method of claim 1, wherein the selected information includes at least an identifier of a source, the method further comprising starting an interactive communications session between the user device and the source based on the identifier.

5. The method of claim 1, wherein receiving the selected information is performed using a Session Initiation Protocal Info message.

6. The method of claim 1, further comprising launching an application to display the ticker.

7. The method of claim 1, further comprising establishing a Session Initiation Protocol call session, wherein receiving the selected information comprises receiving the selected information in messaging communicated during the call session.

8. The method of claim 1, wherein requesting the selected information is performed using a Session Initiation Protocol Info message.

9. The method of claim 8, wherein receiving the selected information comprises receiving the selected information in a Session Initiation Protocol Info message.

10. The method of claim 1, further comprising:

receiving an address of another party in the received selected information; and establishing a call session with the another party using the address.

11. A method of communicating information over a packet-based network, comprising:

requesting selected information to be received from an information provider system;

receiving the selected information over the packet-based network;

displaying the selected information as a ticker on a user device, wherein the requesting and displaying are performed by the user device;

receiving, at the user device, a request for second selected information; and sending, from the user device, the second selected information for presenting on another device as a ticker.

12. A method of communicating information over a packet-based network, comprising:

requesting selected information to be received from an information provider system;

receiving the selected information over the packet-based network; and displaying the selected information as a ticker on a user device, wherein requesting the selected information is performed using messaging consistent with a Session Initiation Protocol.

13. The method of claim 12, wherein requesting the selected information is performed using a Subscribe message.

14. The method of claim 13, wherein receiving the selected information is performed using a Notify message.

15. A system capable of communicating over a packet-based network, comprising:

one or more storage units containing a list including at least one user device; and a controller adapted to communicate selected information in at least one of first messaging and second messaging for presentation as a ticker to each of the at least one user device, the first messaging defined by a protocol providing for real-time interactive communications sessions, and the second messaging defined by an extension of the protocol providing for real-time interactive communications sessions.

16. The system of claim 15, wherein the list contains information identifying at least a category of information of interest to the user device.

17. The system of claim 15, further comprising an interface to receive a request for ticker information from a second user device, wherein the controller adds the second user device to the list.

18. The system of claim 17, wherein the request includes a Subscribe message.

19. The system of claim 17, wherein the request includes a Session Initiation Protocol Invite request.

20. The system of claim 17, wherein the request includes a Session Initiation Protocol Info message.

21. The system of claim 15, wherein the second messaging includes a Session Initiation Protocol Notify message.

22. The system of claim 15, wherein the first messaging includes a Session Initiation Protocol Info message.

23. The system of claim 15 wherein the controller is adapted to establish a Session Initiation Protocol call session with the at least one user device, wherein the controller is adapted to communicate the selected information during the Session Initiation Protocol call session.

24. The system of claim 15 wherein the controller is adapted to receive a request from the at least one user device for the selected information, the request comprising at least one of a Session Initiation Protocol (SIP) Subscribe message, a SIP Invite message, and a SIP Info message.

25. A system capable of communicating over a packet-based network, comprising:

one or more storage units containing a list including at least one user device; and a controller adapted to communicate selected information in messaging consistent with a protocol providing for real-time interactive communications sessions for presentation as a ticker to each of the at least one user device, wherein the messaging includes Session Initiation Protocol messaging.

26. An article including one or more machine-readable storage media containing instructions for presenting information, the instructions when executed causing a system to:

receive predetermined information selected by a user over a network, the predetermined information received in messaging according to a protocol providing for real-time interactive communications sessions; and present the predetermined information as a ticker on a user interface of the system.

27. The article of claim 26, wherein the instructions when executed cause the system to further send a request to an information provider for the predetermined information.

28. The article of claim 26 wherein the protocol includes a Session Initiation Protocol.

29. The article of claim 26 wherein receiving the predetermined information comprises receiving the predetermined information in at least one of a Session Initiation Protocol (SIP) Notify message and a SIP Info message.

30. The article of claim 26, wherein the instructions when executed cause the system to establish a Session Initiation Protocol call session with an information service provider, wherein receiving the predetermined information is performed during the Session Initiation Protocol call session.

31. A data signal embodied in a carrier wave and including instructions that when executed cause a system to:

receive predetermined information selected by a user over a network, the predetermined information received in Session Initiation Protocol messaging; and present the predetermined information as a ticker on a display of the system.

32. The data signal of claim 31, wherein the instructions when executed cause the system to present the ticker as a scrolling ticker on the display.

33. The data signal of claim 31, wherein the instructions when executed cause the system to present the ticker continuously on the display.

34. The data signal of claim 31, wherein the instructions when executed cause the system to receive further information to update the predetermined information and to present the updated information on the display.

* * * * *